F. CONSOLI.
FINGER BOARD FOR MUSICAL INSTRUMENTS.
APPLICATION FILED JUNE 29, 1910.

973,719.

Patented Oct. 25, 1910.

Witnesses
B. J. Crawford
H. R. George

Inventor
Frank Consoli,
By Edwin Guthrie,
Attorney

UNITED STATES PATENT OFFICE.

FRANK CONSOLI, OF BROOKLYN, NEW YORK.

FINGER-BOARD FOR MUSICAL INSTRUMENTS.

973,719. Specification of Letters Patent. Patented Oct. 25, 1910.

Application filed June 29, 1910. Serial No. 569,532.

*To all whom it may concern:*

Be it known that I, FRANK CONSOLI, citizen of the United States, residing at Brooklyn, in the county of Kings and State of New York, have invented certain new and useful Improvements in Finger-Boards for Musical Instruments, of which the following is a specification.

This invention relates to finger boards for musical instruments for violins and stringed musical instruments of like character, and has for its object the construction of a finger board provided with substitutes for frets having special formation and arrangement whereby it is believed means are introduced to enable a player, particularly a beginner, to quickly and definitely ascertain the proper position whereon to place the finger to produce a desired tone or note, and by the introduction of which means the appearance of the finger board is not materially changed.

This invention consists in forming narrow recesses across the finger board at predetermined distances from each other, and in placing pieces of metal or other chosen material in the recesses, leaving a very shallow space near the top of each recess unoccupied.

Figure 1:
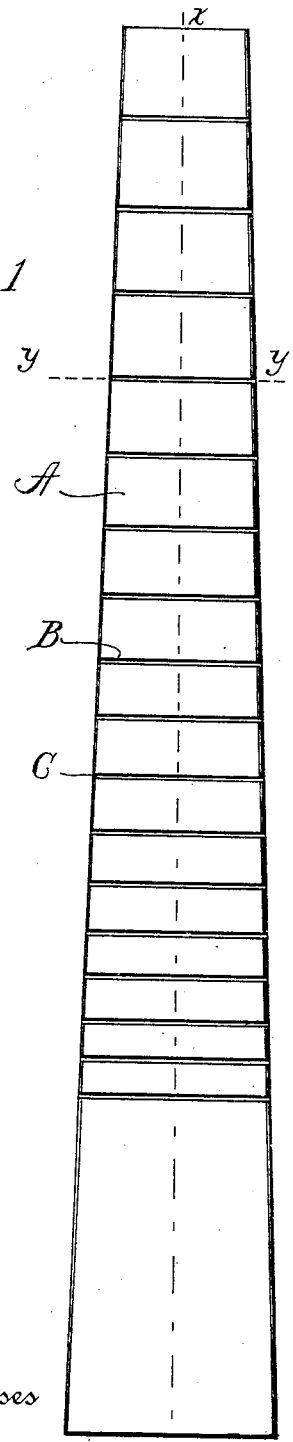
Figure 2:
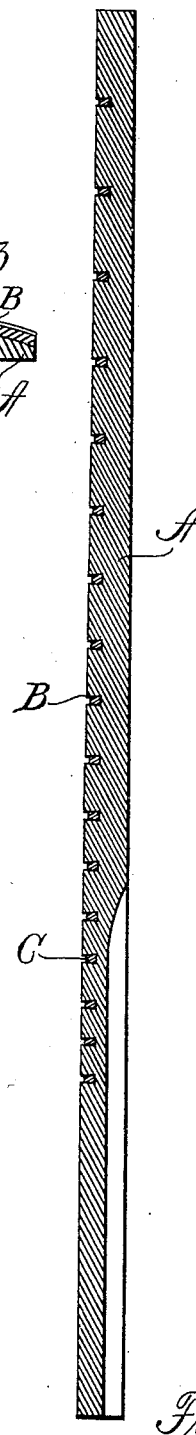

The construction and arrangement constituting this invention is set forth in the accompanying drawings of which Figure 1 represents a front or face view of a finger board constructed in accordance with this invention. Fig. 2 is a section lengthwise on the line *x—x* of Fig. 1, and Fig. 3 is a cross-section on line *y—y* of Fig. 1.

The same letter is employed to refer to the same part throughout the description and drawings.

Considering the drawings, Fig. 1 and Fig. 2 show a finger board of usual size and construction marked A. Across the finger board A at chosen intervals are formed the recesses B, and in each recess there is placed a piece of material C, that may be slightly wedge-shaped, as shown in Fig. 2. While in Fig. 3, the cross piece C is shown as curved in correspondence with the surface of the finger board A, that form is not essential, as the bottom of the recess may extend straight across the finger board. It is believed to be clear, however, that the curved cross piece C enables the recess B to be of the same depth throughout, and the finger board is not materially weakened or rendered liable to become broken across, which would be the case if the bottom of the recess extended in a straight line across the finger board.

Figure 3:
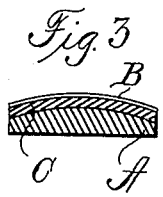

In Fig. 3, the depth of the unoccupied upper part of the recess B is best shown.

In playing the instrument, for example, assuming this invention to be applied to a violin, it is found by experiment that the strings may be perfectly stopped at the recesses indicating the note positions, while the gliding movements of the fingers from one portion of the finger board to another position is in no way interfered with. The thus marking both visually and to the sense of touch of the finger positions for the production of the various notes is particularly useful in the case of beginners, and it is also essential that there shall be no obstacles upon the surface of the finger board to prevent the easy and rapid sliding of the fingers along it.

The cross pieces C may be of any chosen material, but, they are usually of metal as stated, and, therefore, of different color from the customary ebony of the finger board, thus rendering the positions of the substitutes for frets clearly visible.

Having now described this invention, and explained the mode of its operation, what I claim and seek to secure by Letters Patent of the United States is:—

1. A finger board for musical instruments having narrow recesses in its upper surface extending across the finger board, and cross pieces less in width than the depth of the said recesses, the said cross pieces being constructed to fit tightly in said recesses, and the said cross pieces being placed upon the bottoms of the recesses leaving a portion of each recess at the top empty whereby the position of each recess may be detected by touch.

2. A finger board for musical instruments having narrow wedge-shaped recesses in its upper surface extending across the finger board, and wedge-shaped cross pieces less in width than the depth of the said recesses, the said cross pieces being constructed to fit tightly in said recesses, and the said cross pieces being placed upon the bottoms of the recesses leaving a portion of each recess at the top empty whereby the position of each recess may be detected by touch.

3. A finger board for musical instruments having narrow recesses in its upper surface extending across the finger board, the upper surface of the finger board being curved transversely and the bottoms of said recesses being curved correspondingly, and cross pieces less in width than the depth of said recesses, the said cross pieces being curved and constructed to fit tightly in said recesses, and the said cross pieces being placed upon the bottoms of the said recesses and a portion of each recess at the top is left empty whereby the position of each recess may be detected by touch.

In testimony whereof I affix my signature in presence of two witnesses.

FRANK CONSOLI.

Witnesses:
LUIGI DI PAOLO,
SAVERIO GALLO.